(12) United States Patent
Keller

(10) Patent No.: US 7,575,241 B1
(45) Date of Patent: Aug. 18, 2009

(54) APPARATUS FOR ASSISTING A HUNTER FROM A SUPINE TO A SEATED POSITION

(76) Inventor: Louis Keller, HC64 Box 66, Timber Lake, SD (US) 57656

(*) Notice: Subject to any disclaimer, the term of this patent is extended or adjusted under 35 U.S.C. 154(b) by 463 days.

(21) Appl. No.: 11/443,331

(22) Filed: May 30, 2006

(51) Int. Cl.
B62B 7/12 (2006.01)

(52) U.S. Cl. .............................. 280/32.5; 280/63; 43/1; 135/901

(58) Field of Classification Search ................ 280/32.5, 280/32.6, 63, 47.131, 47.24, 19.1; 43/1, 43/2, 3; 135/901
See application file for complete search history.

(56) References Cited

U.S. PATENT DOCUMENTS

| | | | | |
|---|---|---|---|---|
| 1,347,748 A | * | 7/1920 | Lytwynec | 297/363 |
| 4,581,837 A | * | 4/1986 | Powlus | 43/1 |
| 5,075,999 A | * | 12/1991 | Fredericks | 43/1 |
| 5,261,725 A | * | 11/1993 | Rudolph | 297/361.1 |
| 5,330,212 A | * | 7/1994 | Gardner | 280/40 |
| 5,678,346 A | * | 10/1997 | Kellett | 43/2 |
| 5,787,632 A | * | 8/1998 | Kraut | 43/1 |
| 5,822,906 A | * | 10/1998 | Ward | 43/1 |
| 5,903,997 A | * | 5/1999 | Jacob | 43/1 |
| 5,921,627 A | * | 7/1999 | Risetter | 297/293 |
| 6,415,807 B1 | * | 7/2002 | Maher | 135/99 |
| 6,557,867 B1 | * | 5/2003 | Angstadt | 280/30 |

OTHER PUBLICATIONS

Advertisement, Ducks Unlimited Showcase, May-Jun. 2006, p. 33.
Advertisement, Ducks Unlimited Showcase, Jul.-Aug. 2006, p. 53.

* cited by examiner

Primary Examiner—Christopher P Ellis
Assistant Examiner—Brian Swenson
(74) Attorney, Agent, or Firm—James J. Paige; Nikolai & Mersereau, P.A.

(57) ABSTRACT

An apparatus for assisting a person from a supine position to a seated position is disclosed, and comprises a base assembly for supporting a lower torso portion and legs of a user when the base assembly is rested on a ground surface, and a torso raising assembly for raising an upper torso portion of the user into a substantially upright position. The torso raising assembly is movable between a lowered position and a raised position. Optionally, the apparatus may include a decoy assembly for at least partially covering the user when lying supine on the torso raising assembly.

18 Claims, 5 Drawing Sheets

APPARATUS FOR ASSISTING A HUNTER FROM A SUPINE TO A SEATED POSITION

BACKGROUND OF THE INVENTION

1. Field of the Invention

The present invention relates to hunting assistance devices and more particularly pertains to a new apparatus for assisting a hunter from a supine to a seated position to facilitate hunting by persons who find it difficult to raise themselves up from a supine position to fire a gun at the quarry of the hunt.

2. Description of the Prior Art

Hunting various types of wildlife, such as waterfowl, is sometimes conducted by a hunter lying on his or her back in a supine position in a field, waiting for the quarry of the hunt to approach or fly over the hunter. The hunter will typically raise his or her torso into a raised position, so that the user is sitting, in order to fire a firearm.

However, people with limited flexibility or mobility can find movement from the supine to sitting position to be difficult under any circumstances, and then to accomplish this in a relatively quick manner can be virtually impossible. Since persons who develop such an impairment may desire to begin or continue to hunt in this manner, it is believed that there is a need for an apparatus that assists the hunter in moving from a supine position to a sitting position.

SUMMARY OF THE INVENTION

The present invention provides a new apparatus for assisting a hunter from a supine to a seated position. The apparatus comprises a base assembly for supporting a lower torso portion and legs of a user when the base assembly is rested on a ground surface, and a torso raising assembly for raising an upper torso portion of the user into a substantially upright position. The torso raising assembly is movable between a lowered position and a raised position.

Optionally, the apparatus may include a decoy assembly for at least partially covering the user when lying supine on the torso raising assembly. the decoy assembly may move in response to the movement of the torso raising assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability of the user to relatively quickly shift his or her weight on the apparatus to cause the torso raising assembly to raise the torso of the user from the supine position to the sitting position. The apparatus may also provide a decoy or camouflage appearance to the person utilizing the apparatus, but quickly and easily moves out of the way of the user when the torso raising assembly moves from the lowered to the raised position.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
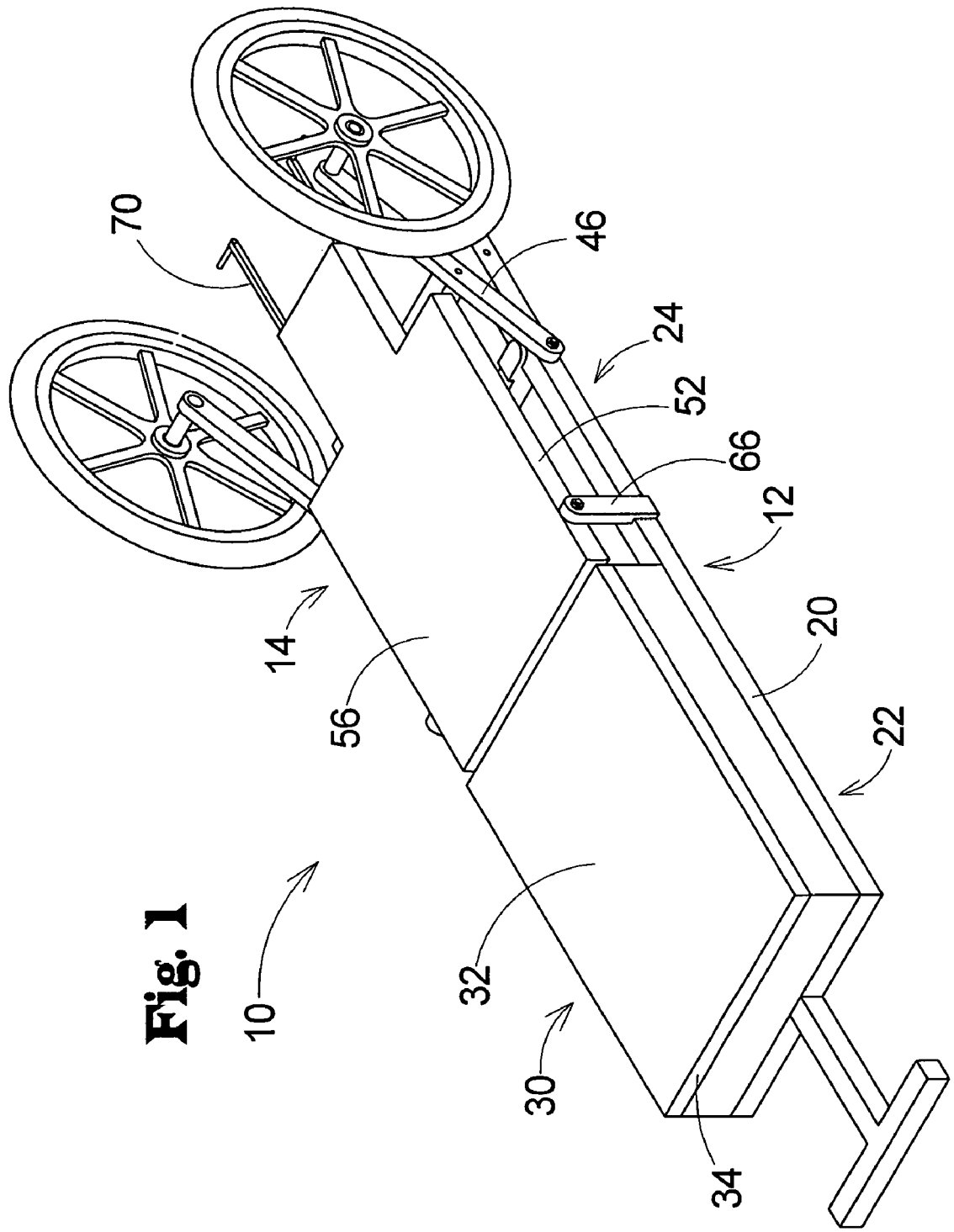
FIG. 1 is a schematic perspective view of a new apparatus for assisting a hunter from a supine to a seated position according to the present invention, particularly showing the torso raising assembly in a lowered position.

With reference now to the drawings, and in particular to FIGS. 1 through 5 thereof, a new apparatus for assisting a hunter from a supine to a seated position embodying the principles and concepts of the present invention and generally designated by the reference numeral 10 will be described.

The invention includes an apparatus 10 that is highly suitable for assisting a person using the apparatus to move from a supine position, in which the user is lying substantially horizontal on his or her back, to a seated position, in which the user's back is substantially vertically oriented. The apparatus 10 may include a base assembly 12 for positioning on a ground surface, a torso raising assembly 14 for lifting a portion of the torso of the user from the supine position, and a biasing assembly 16 for biasing or urging the torso raising assembly toward the raised position. Optionally, the apparatus 10 may also include a decoy assembly 18 for covering or camouflaging the user when the torso raising assembly 14 is in a lowered position and exposing the user for firing a firearm when the torso raising assembly moves from the lowered position to the raised position.

In greater detail, the base assembly 12 generally supports the lower torso portion (such as the buttocks) and the legs of the user. The base assembly 12 may also support other assemblies of the apparatus 10. The base assembly 12 may include a base frame 20 that generally has a first portion 22 and a second portion 24. The base frame 20 may comprise a pair of end elements 26, 27 and a pair of side elements 28, 29 that extend between the end elements. The end elements and the side elements may form an elongated, and substantially rectangular, perimeter. Optionally, the side elements 28, 29 of the base frame 20 may each comprise two or more segments that are pivotally joined together to permit one section of the base frame for be folded into a position substantially adjacent to the other section of the base frame, so that, for example, the end element 26 is moved into a position that is closer to the end element 27 and the longitudinal length of the apparatus 10 is reduced. To achieve this, each of the side elements 28, 29 may be hinged at a medial location along the length of the respective element 28, 29 to permit the clamshell folding of the base frame. This folding of the base frame can permit easier stowage of the apparatus 10 in a vehicle such as an automobile or a plane.

The base assembly 12 may include a support 30 that has an upper support surface 32 for resting the lower torso portion and legs of the user on. The support 30 is mounted on the base frame 20, and may be located on the first portion 22 of the base frame.

The support 30 may comprise a support member 34 that has the upper support surface 32 thereon. The support member 34 may extend substantially parallel to the base frame 20, and may be spaced upwardly from the base frame so that the support 30 may form a storage compartment 36 with an interior 38 located below the support member 34. The support 30 may include a perimeter wall 40 that extends about the interior 38 located below the support member 34. The support 30 may include a base wall 42 that forms and defines a floor of the storage compartment 36. The base wall 42 is positioned below the support member 34 and may be oriented substantially parallel to the support member.

The support member 34 may be pivotable with respect to the base frame 20 to provide access to the interior 38 of the storage compartment formed by the support 30. The support member 34 may be pivotally mounted on the perimeter wall 40 to facilitate such access.

Figure 2:
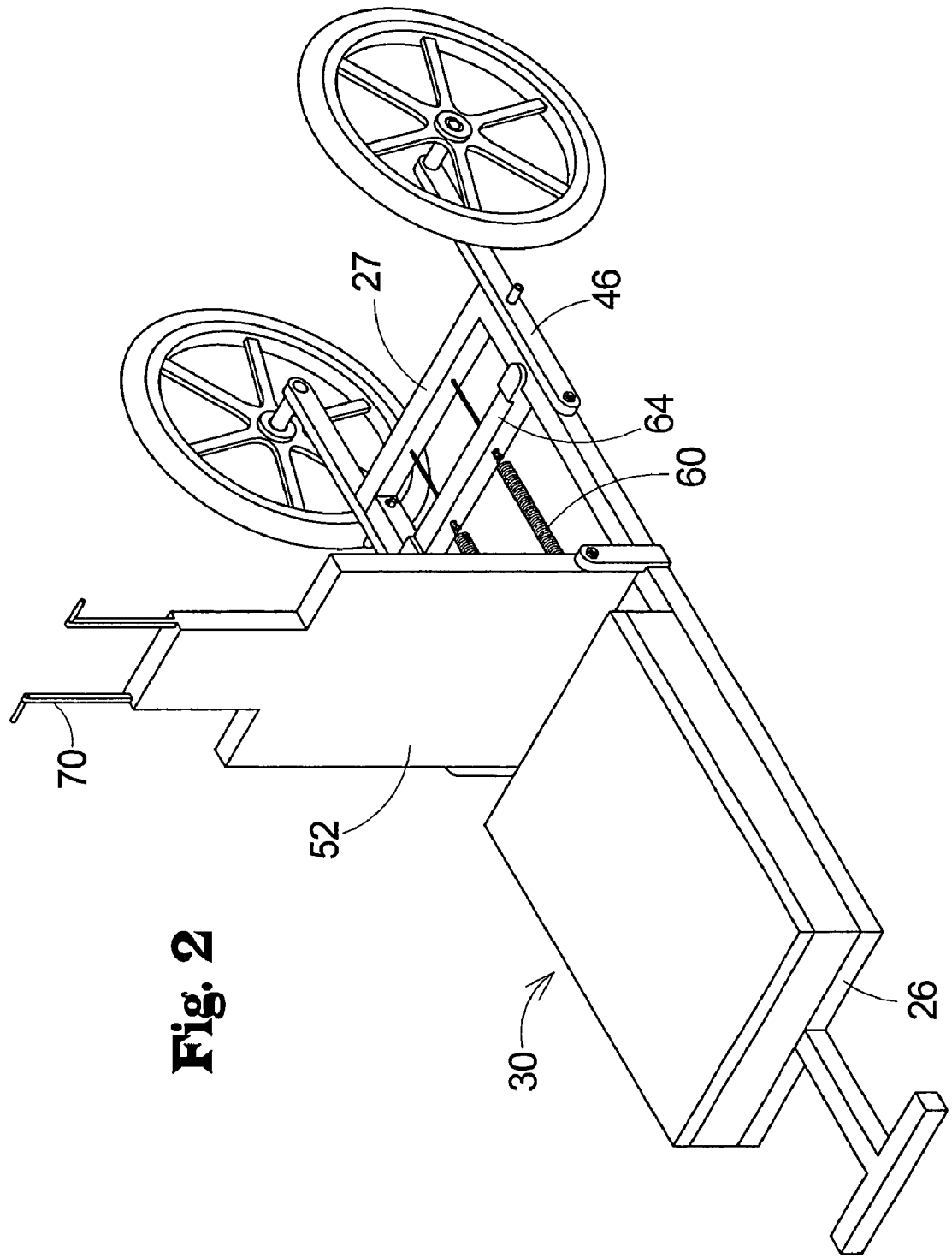
FIG. 2 is a schematic perspective view of the present invention particularly showing the torso raising assembly in a raised position.
Figure 3:
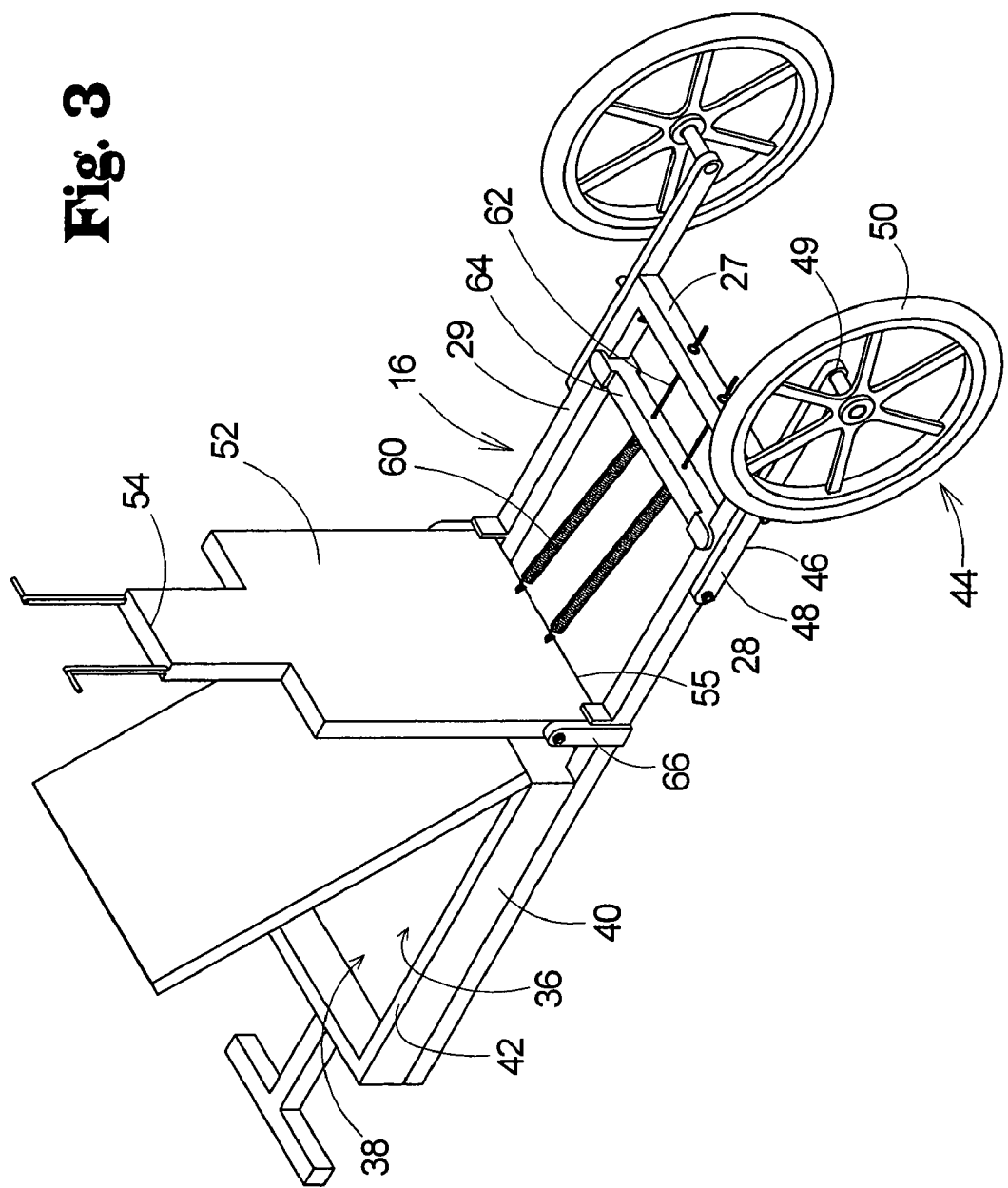
FIG. 3 is a schematic perspective view of the reverse of the present invention showing the torso raising assembly in the raised position.
Figure 4:
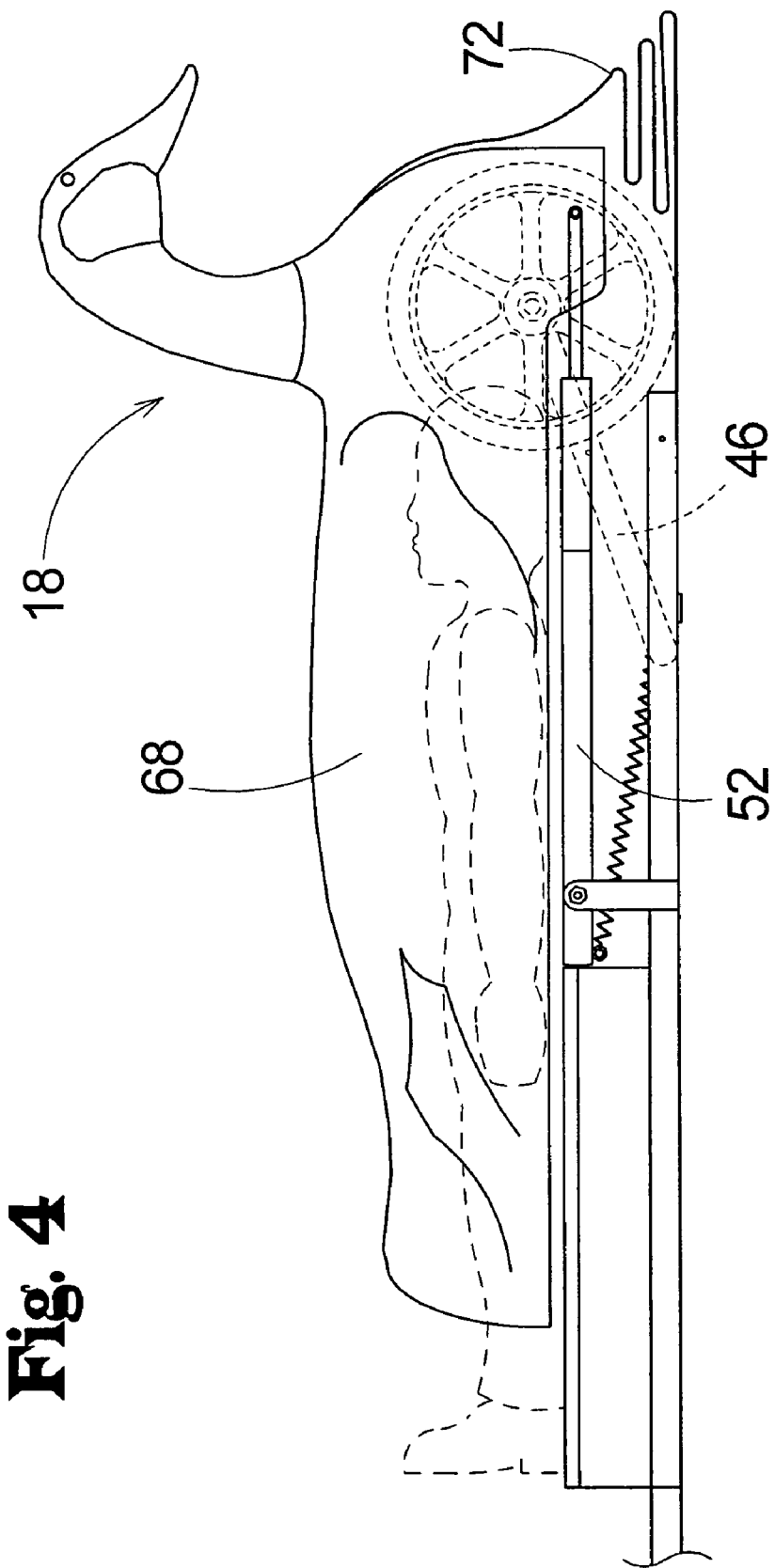
FIG. 4 is a schematic side view of the present invention with the torso raising assembly in the lowered position and the decoy assembly in the covering position.
Figure 5:
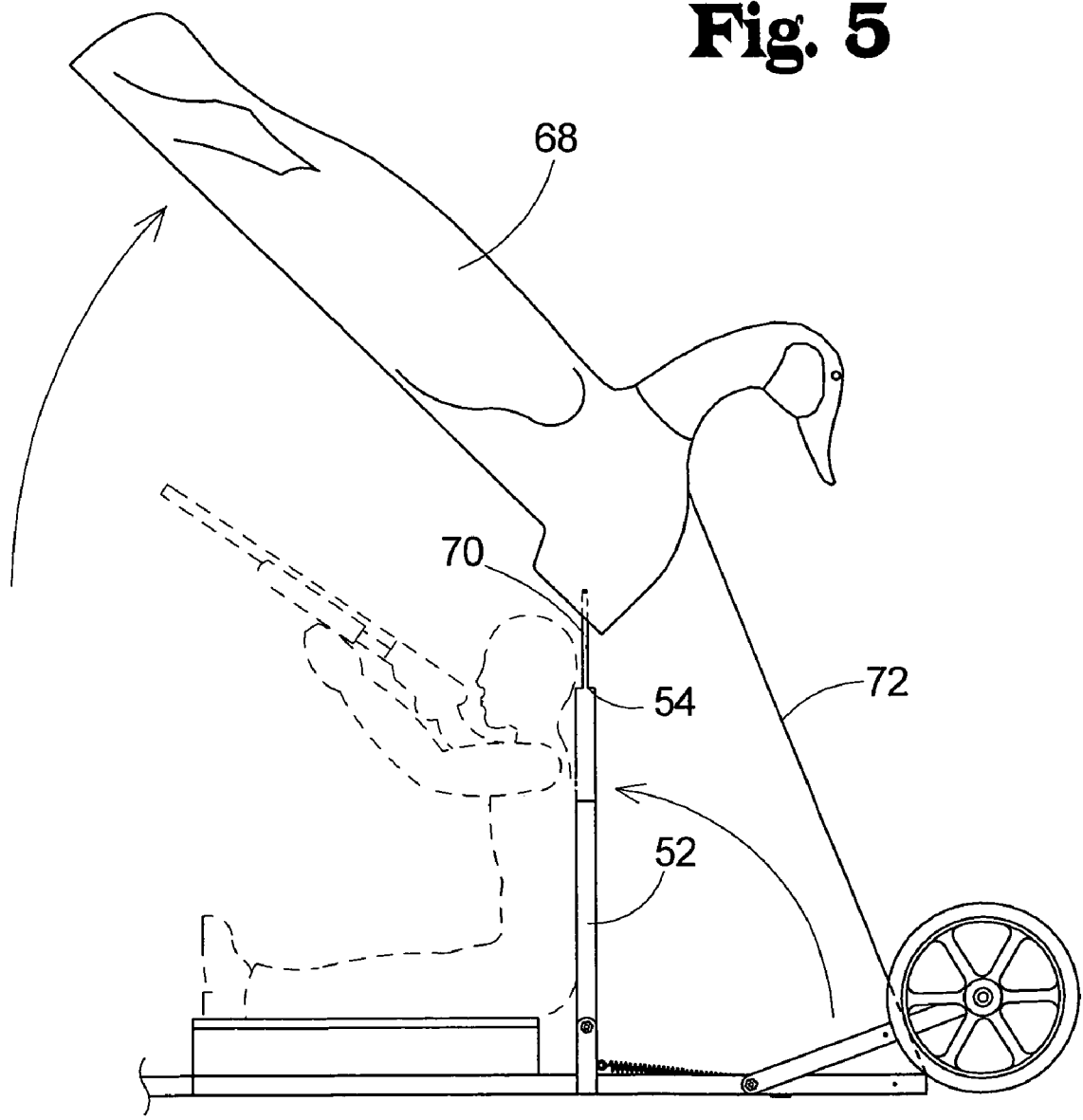
FIG. 5 is a schematic side view of the present invention with the torso raising assembly in the raised position and the decoy assembly in the exposing position.

The base assembly 12 may also include a pair of wheel assemblies 44 with each wheel assembly being mounted on the base frame 20. Each of the wheel assemblies 44 may be movable between a deployed position (such as shown in FIG. 2) and a stored position (such as shown in FIG. 1). To achieve the movement between the deployed and stored positions, each of the wheel assemblies 44 may be pivotable with respect to the base frame 20. Each of the wheel assemblies 44 may comprise a wheel support arm 46 mounted on the base frame 20, and it may be pivotable with respect to the base frame. The wheel support arm 46 may have a first end 48 and a second end 49, and the first end 48 may be pivotally mounted on the base frame 20. Each of the wheel assemblies 44 may further comprise a wheel 50 that is rotatably mounted on the wheel support arm 46. The wheel 50 may be mounted on the wheel support arm 46 toward the second end 49 of the arm 46. The wheel support arm 46 is pivotable to move the wheel 50 between the deployed and storage positions. Optionally, alignable holes may be formed in each of the wheel support arms 46 and the base frame such that an element may be inserted through the aligned holes to secure the wheel assemblies in the deployed position. It will be appreciated by those skilled in the art that the wheel assemblies 44 may have more than two positions, and may have different positions from that depicted in the drawings. For example, the wheel assemblies may optionally have a position in which the axle or axis of rotation of each of the wheels is positioned below the base frame 20, thus raising the base frame further away from the ground surface on which the wheels are resting. Such a position may be useful for when a relatively large decoy assembly 18 is employed, and might otherwise drag along the ground surface.

The torso raising assembly 14 raises an upper torso portion of the user into a substantially upright position. As previously noted, the torso raising assembly 14 is movable between the lowered position (such as shown in FIG. 1) and a raised position (such as shown in FIG. 2). In greater detail, the torso raising assembly 14 comprises a lifting member 52 is pivotable with respect to the base assembly 12. The lifting member 52 has a lowered position corresponding to the lowered position of the torso raising assembly and a raised position corresponding to the raised position of the torso raising assembly. The lifting member 52 is pivotally mounted on the base assembly 12. The lifting member 52 has an outboard end 54 and an inboard end 55. The inboard end 54 may be positioned adjacent to the support 30, and may be pivotable with respect to the support. The lifting member 52 may be pivotable about an axis that is located along the lifting member, but is located at an offset from the inboard end 54 of the lifting member so that, when the lifting member moves toward the raised position from the lowered position, the inboard end swings downwardly while the outboard end swings upwardly. The lifting member 52 has an upper surface 56, which may be oriented substantially coplanar with the upper support surface 32 of the support 30.

The biasing assembly 16 may be provided for biasing the lifting member 52 toward the raised position. The biasing assembly 14 may be connected to the lifting member 52 and the base assembly 12. Illustratively, the biasing assembly 16 may be connected to the inboard end 55 of the lifting member. The biasing assembly 16 may comprise at least one spring 60, and preferably a pair of springs, that extends between the lifting member 52 and the base frame 20. The spring 60 may comprise a tension coiled spring, but those skilled in the art recognize that other biasing elements, such as torsion springs, tension cords and the like may be used.

The biasing assembly 14 may further comprise an adjustment member 62 that extends between the spring 60 and the base frame 20. The adjustment member 62 may have a length between the spring member and the base frame that is adjustable to adjust an amount of tension on the spring 60 to thereby adjust the amount of biasing force applied by the biasing assembly 14 to the lifting member 52. Thus, decreasing the length of the adjustment member 62 functions to increase the length of the spring 60, and applies a greater biasing force to the lifting member. Conversely, increasing the length of the adjustment member 62 functions to decrease the length of the spring 60, and applies a lesser biasing force to the lifting member. Illustratively, at least a portion of an exterior of the adjustment member 62 is threaded, and the adjustment member 62 passes through one of the end elements 27 of the base frame 20. A nut may be mounted on the threaded portion of the adjustment member 62 to increase or decrease the length of the member 62 located between the spring 60 and the base frame 20. Optionally, other structures may be employed to apply an adjustable amount of tension to the spring.

The biasing assembly 14 may also include an intermediate member 64 that may be employed to connect the spring 60 and the adjustment member 62. To accomplish this, the spring 60 may be mounted on the intermediate member 64, and the adjustment member 62 may also be mounted on the intermediate member. The intermediate member 64 may extend in a substantially parallel orientation to one of the end elements 27 of the base frame 20, and may extend between the side elements 28, 29 of the base frame.

The torso raising assembly 14 may include a mounting standard 66 that supports the lifting member 52 on the base frame 20, and may extend upwardly from the base frame. The lifting member 52 may be pivotally mounted on the mounting standard 22 so that the lifting member pivots with respect to the standard. The mounting standard 66 may comprise a pair of posts, with each post of the pair of posts extending upwardly from one of the side elements 28, 29 of the base frame 20.

The decoy assembly 18 may be provided for at least partially covering the user when lying supine on the torso raising assembly 14, so that the user is not readily visible to the quarry of the hunt while the apparatus 10 is being used. The decoy assembly 18 may be mounted on the torso raising assembly 14, and may be movable between a covering position (see FIG. 4) and an exposing position (see FIG. 5). The decoy assembly 18 may comprise a decoy body 68 that is mounted on the torso raising assembly 14 and that may be pivotable with respect to the torso raising assembly. The decoy body 68 may have an outer surface with an appearance that is similar to an animal, and in some embodiments, the outer surface has an appearance similar to a waterfowl, although other appearances may be employed. A hole may be provided in the decoy body to permit the user lying on the apparatus to look upward through the body.

The decoy assembly 18 may further comprise a decoy body mounting structure 70 that may be mounted on the lifting member 52. The mounting structure 70 may be located on the outboard end 54 of the lifting member 52, and may extend outwardly from the outboard end of the lifting member. The mounting structure 70 may be mounted to the decoy body 68 at a substantially medial location on the body that is spaced from the front of the decoy body. The decoy body mounting structure 70 may comprise a pair of elements that extend in a plane of the lifting member, and may be substantially rigidly mounted on the lifting member.

The decoy assembly 18 may further comprise a decoy body tilting member 72 that is configured to tilt the decoy body 68 when the lifting member 52 moves between the lowered position and the raised position. The decoy body tilting member 72 may extend between the decoy body 68 and the base assembly 12, and may be connected to the decoy body forward of the mounting of the decoy body to the decoy body mounting structure 70. The decoy body tilting assembly 72 may be configured to position the decoy body 68 in a substantially horizontal orientation when the torso raising assembly 14 is in the lowered position (see FIG. 4) and tilting the decoy body into a substantially vertical orientation when the torso raising assembly is in the raised position (see FIG. 5). The decoy body tilting member 72 may be mounted on the base frame 20 (or other portion of the apparatus 10 that does not move when the torso raising assembly moves), and the tilting member may have an adjustable length to adjust the degree or extent of the tilting of the decoy body 68. Further, the tilting member 72 may be flexible or substantially rigid.

Optionally, the base frame 20 may be provided with a handle that extends, for example, from one of the end elements 26, 27, and facilitates towing of the apparatus 10 when the wheels assemblies are in the deployed position. The handle may have a configuration that is suitable for hand towing, such as is shown in the drawings. As a further option, the handle may have a configuration that is suited for vehicle towing, such as a hitch structure or a loop that extends from the end element of the base frame. As a further option, provision may be made for the interchangeable mounting of different handles that are suited for different uses, such as those set forth above.

In use, the user lies supine on the support 30 and the torso lifting member 52, with the upper torso on the support 30 and the buttocks and legs of the user on the lifting member. The exact positioning of the user may be adjusted to place a sufficient portion of the user's weight on the lifting member to hold the lifting member in the lowered position. The decoy apparatus may be employed on the apparatus 10, so that the decoy body extends over the body of the user when the torso raising assembly is in the lowered position. Upon seeing the quarry of the hunt, the user may shift his or her weight from the lifting member to the support 30, to thereby decrease the portion of the weight of the user that is located on the lifting member that counteracts the force applied by the biasing assembly 16. The weight shift may allow the torso raising assembly to exert sufficient force on the users torso to lifting the torso and move the user to a seated position.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for assisting a person from a supine position to a seated position, comprising:
   a base assembly for supporting a lower torso portion and legs of a user when the base assembly is rested on a ground surface;
   a decoy assembly for at least partially covering the user when lying supine on the torso raising assembly, the decoy assembly comprises a decoy body mounted on the torso raising assembly, the decoy body having an outer surface with an appearance similar to an animal; and
   a torso raising assembly for raising an upper torso portion of the user into a substantially upright position, the torso raising assembly being movable between a lowered position and a raised position.

2. The apparatus of claim 1 wherein the decoy assembly is mounted on the torso raising assembly, the decoy assembly being movable between a covering position and an exposing position.

3. The apparatus of claim 1 wherein the base assembly comprises:
   a base frame; and
   a support with an upper support surface for resting a lower torso portion and legs of the user on, the support being mounted on the base frame.

4. The apparatus of claim 3 wherein the support forms a storage compartment with an interior below the upper support surface.

5. The apparatus of claim 1 wherein the base assembly comprises a pair of wheel assemblies each mounted on the base frame.

6. The apparatus of claim 5 wherein each of the wheel assemblies is movable between a deployed position in which the wheel assemblies support a base frame of the base assembly above the ground surface such that the wheel assemblies support the base frame above the ground surface and a stored position in which the wheel assemblies permit the base frame to rest upon the ground surface.

7. The apparatus of claim 1 wherein the torso raising assembly comprises:
- a lifting member pivotable with respect to the base assembly; the lifting member having a lowered position and a raised position; and
- a biasing assembly for biasing the lifting member toward the raised position.

8. The apparatus of claim 7 wherein the biasing assembly is connected to the lifting member and the base assembly.

9. The apparatus of claim 8 wherein the lifting member is pivotably mounted on the base assembly, the lifting member having an outboard end and an inboard end, the lifting member being pivotable about an axis located offset from the inboard end of the lifting member so that the inboard end swings downwardly when the outboard end swings upwardly and the lifting member moves toward the raised position.

10. The apparatus of claim 7 wherein the biasing assembly comprises:
- at least one spring extending between the lifting member and the base assembly; and
- an adjustment member extending between the at least one spring and the base assembly, the adjustment member having an adjustable length between the at least one spring member and the base frame to adjust an amount of tension of the at least one spring member.

11. The apparatus of claim 1 wherein the decoy body is pivotable with respect to the torso raising assembly.

12. The apparatus of claim 1 wherein the decoy assembly further comprises a decoy body mounting structure mounted on the lifting member, the mounting structure being located on the outboard end of the lifting member.

13. The apparatus of claim 1 wherein the decoy assembly further comprises a decoy body tilting member configured to tilt the decoy body when the lifting member moves between the lowered position and the raised position.

14. The apparatus of claim 13 wherein the decoy body tilting member extends between the decoy body and the base assembly, the decoy body tilting member is configured to position the decoy body in a covering position for covering a portion of the body of the user when the torso raising assembly is in the lowered position, and tilting the decoy body into a exposing position that exposes the portion of the body of the user when the torso raising assembly is in the raised position.

15. The apparatus of claim 1 additionally comprising a decoy assembly for at least partially covering the user when lying supine on the torso raising assembly;
- wherein the decoy assembly is mounted on the torso raising assembly, the decoy assembly being movable between a covering position and an exposing position;
- wherein the base assembly comprises:
  - a base frame; and
  - a support with an upper support surface for resting a lower torso portion and legs of the user on, the support being mounted on the base frame;
- wherein the support forms a storage compartment with an interior below the upper support surface;
- wherein the base assembly comprises a pair of wheel assemblies each mounted on the base frame;
- wherein each of the wheel assemblies is movable between a deployed position in which the wheel assemblies support a base frame of the base assembly above the ground surface such that the wheel assemblies support the base frame above the ground surface and a stored position in which the wheel assemblies permit the base frame to rest upon the ground surface;
- wherein the torso raising assembly comprises:
  - a lifting member pivotable with respect to the base assembly, the lifting member having a lowered position and a raised position; and
  - a biasing assembly for biasing the lifting member toward the raised position;
- wherein the biasing assembly is connected to the lifting member and the base assembly;
- wherein the lifting member is pivotably mounted on the base assembly, the lifting member having an outboard end and an inboard end, the lifting member being pivotable about an axis located offset from the inboard end of the lifting member so that the inboard end swings downwardly when the outboard end swings upwardly and the lifting member moves toward the raised position;
- wherein the biasing assembly comprises:
  - at least one spring extending between the lifting member and the base assembly; and
  - an adjustment member extending between the at least one spring and the base assembly, the adjustment member having an adjustable length between the at least one spring member and the base frame to adjust an amount of tension of the at least one spring member;
- wherein the decoy assembly comprises a decoy body mounted on the torso raising assembly, the decoy body having an outer surface with an appearance similar to an animal;
- wherein the decoy body is pivotable with respect to the torso raising assembly;
- wherein the decoy assembly further comprises a decoy body mounting structure mounted on the lifting member, the mounting structure being located on the outboard end of the lifting member;
- wherein the decoy assembly further comprises a decoy body tilting member configured to tilt the decoy body when the lifting member moves between the lowered position and the raised position; and
- wherein the decoy body tilting member extends between the decoy body and the base assembly, the decoy body tilting member is configured to position the decoy body in the covering position for covering a portion of the body of the user when the torso raising assembly is in the lowered position, and tilting the decoy body into the exposing position that exposes the portion of the body of the user when the torso raising assembly is in the raised position.

16. An apparatus for assisting a person from a supine position to a seated position, comprising:
- a base assembly for supporting a lower torso portion and legs of a user when the base assembly is rested on a ground surface;
- a torso raising assembly for raising an upper torso portion of the user into a substantially upright position, the torso raising assembly being movable between a lowered position and a raised position, the torso raising assembly having a lifting member pivotable with respect to the base assembly; the lifting member having a lowered position and a raised position;

a biasing assembly for biasing the lifting member toward the raised position, the biasing member having at least one spring extending between the lifting member and the base assembly; and an adjustment member extending between the at least one spring and the base assembly, the adjustment member having an adjustable length between the at least one spring member and the base frame to adjust an amount of tension of the at least one spring member.

17. The apparatus of claim 16 additionally comprising a decoy assembly for at least partially covering the user when lying supine on the torso raising assembly.

18. The apparatus of claim 17 wherein the decoy assembly is mounted on the torso raising assembly, the decoy assembly being movable between a covering position and an exposing position.

* * * * *